United States Patent [19]
McKay

[11] Patent Number: 5,424,794
[45] Date of Patent: Jun. 13, 1995

[54] RED-EYE REDUCTION SYSTEM

[75] Inventor: Robert M. McKay, Westlake Village, Calif.

[73] Assignee: Vivitar Corporation, Chatsworth, Calif.

[21] Appl. No.: 152,978

[22] Filed: Nov. 15, 1993

[51] Int. Cl.⁶ ............................................. G03B 15/03
[52] U.S. Cl. ................... 354/145.1; 354/415
[58] Field of Search .................. 354/415, 132, 149.11

[56] References Cited

U.S. PATENT DOCUMENTS

| | | | |
|---|---|---|---|
| 3,842,428 | 10/1974 | Kawasaki | 354/415 |
| 4,285,588 | 8/1981 | Mir | 354/126 |
| 4,855,771 | 8/1989 | Alligood et al. | 354/149.11 |
| 4,978,989 | 12/1990 | Nakano et al. | 354/149.11 |
| 5,010,412 | 4/1991 | Garriss | 354/132 |
| 5,153,632 | 10/1992 | Maida et al. | 354/415 |
| 5,202,719 | 4/1993 | Taniguchi et al. | 354/132 |
| 5,206,678 | 4/1993 | Kazumi | 354/415 |
| 5,231,446 | 7/1993 | Ohtsuka | 354/415 |
| 5,262,809 | 11/1993 | Nishimura et al. | 354/132 |

Primary Examiner—David M. Gray
Attorney, Agent, or Firm—Lyon & Lyon

[57] ABSTRACT

There is disclosed herein a compact flash camera or flash unit including a red-eye reduction lamp on or near the front of the camera to shine light toward the subject being photographed to minimize or eliminate the red-eye problem. The camera includes a conventional electronic flash system, along with a flash ready light to provide an indication when the flash system is sufficiently energized to fire the flash tube thereof. The red-eye reduction lamp and the flash ready lamp, whether two separate lamps or a single lamp, are turned on and off together so that the red-eye reduction lamp is on and emitting light toward the subject to be photographed whenever the flash is ready to fire. This system minimizes the care the photographer needs to exercise when composing and taking a photograph. The principal applies to both built in flashes and detachable flashes.

9 Claims, 1 Drawing Sheet

RED-EYE REDUCTION SYSTEM

The present invention relates to flash photography and more particularly to a compact photographic camera and flash unit having a red-eye reduction system.

BACKGROUND OF THE INVENTION

As photographic cameras have become smaller or more compact, the phenomenon of "red-eye" has become more of a problem. This phenomenon occurs in flash photography and results in a bright red dot aligned with the pupils of the subject's eyes. It has been recognized that the likelihood and severity of this effect increases with decreased flash-to-lens separation of the photographic system. Because of this, the red-eye effect has imposed a substantial problem in attempting to meet the desire in providing more compact cameras.

Various solutions have been attempted, including increasing the camera's flash-to-lens spacing. Flash extenders have been provided for cameras adapted to use flash cubes, and extended or elongated flash lamp units have been provided to reduce this red-eye effect. An example is shown in U.S. Pat. No. 4,855,771 which discloses a compact camera and flash unit, and wherein the flash unit is movable to extend the distance between the camera lens and the flash unit for reducing the red-eye effect.

Other approaches to reducing the red-eye effect have been to provide some form of preliminary light or pre-flash before the main flash from an electronic flash unit. This usually is a short duration flash, the purpose of which is to cause the size of the subject's pupil to be reduced to thereby reduce this annoying effect. An example system of this nature is disclosed in U.S. Pat. No. 4,285,588. That patent describes that the intensity of the flash light reflected by the retina is reduced significantly because such reflected light intensity varies as the square of the pupil aperture during flash light's entry. The actual size of the red-eye spot on the resulting print is directly proportional to the size of the pupil during exit of the reflected flash light. Thus, it is discussed in that patent that both the size and intensity of the red-eye spot are decreased by reducing the pupil size. Other examples of pre-flash or preparatory flash systems are shown in U.S. Pat. Nos. 3,842,428 and 5,153,632. Other systems include steady or pulsating sources such as a red LED or white bulb.

The systems for reduction of the red-eye effect all require some specific operator action or camera control circuitry. One system of this nature requires the operator to depress the shutter release slightly and hold it for at least one second, although it can be held longer, to provide a preflash or even a short duration illumination of the subject. Other systems include a separate button, usually on the back of the camera, which is pushed to turn on a red-eye reduction light on the front of the camera. Still further systems which are automatic involve internal camera circuitry which, when the shutter button is touched and pushed, illuminates a red-eye reduction light and imposes approximately a one second delay before taking the picture while the red-eye reduction light illuminates the subject. Unfortunately, the subject may change position during this one second delay, e.g., turn her or his head away, such that an undesirable or unusable picture results.

Thus, since at least approximately one second of illumination is necessary to cause the pupils to close down and reduce or eliminate the red-eye effect, all systems either impose a delay automatically, or require the user to carefully push the shutter button partway down and wait approximately one second, or push some other button to provide the red-eye reduction illumination. Unfortunately, the delay imposed automatically by the automatic camera/flash systems creates difficulties in obtaining good pictures, and where control must be exercised by the operator many times the operator does not have a sufficiently gentle touch and pushes the shutter button too far and/or too fast such that a flash picture is taken before the red-eye reduction takes effect. Those cameras that have a separate button that is required to be depressed to activate the red-eye reduction function, require that the operator think about and remember to do so. Needless to say, all of these arrangements are difficult and cumbersome to use reliably.

Additionally, detachable flash units used with the hot shoe of a camera, typically have been relatively tall so as to achieve a fairly large lens-to-flash spacing, also for purposes of red-eye reduction. When the flash unit is attached to the hot shoe of the camera, the combination tends to be relatively bulky in order to achieve this red-eye reduction.

SUMMARY OF THE INVENTION

According to the present invention, the difficulties with the prior systems are overcome by providing a system and method which neither requires automatic circuitry within the camera or flash unit to impose a delay nor require the operator to think or take any action to achieve a red-eye reduction function. This is accomplished by having the red-eye reduction illumination come on whenever the flash system is ready to fire, such as whenever the flash "ready" light comes on thereby indicating that the flash firing capacitor or power source is in a charged state for firing the flash. The concepts of the present invention are applicable both to compact cameras having a built-in flash as well as to detachable flash units themselves.

Also, the red-eye reduction lamp and ready light go off automatically without requiring any added circuit for controlling the on/off time and without requiring the operator to remember to do anything special, such as hold a button for a predetermined period of time.

With regard to detachable flash units a red-eye reduction lamp is provided on the flash unit in a location to illuminate the eyes of the subject for red-eye reduction. This can enable flash units to be made with a lower profile and to be less bulky while still allowing the resulting camera/flash unit combination to provide red-eye reduction.

Accordingly, it is a principal object of the present invention to provide an improved red-eye reduction system and method.

A further object of the present invention is to provide a red-eye reduction system having a red-eye reduction lamp which is illuminated continuously when the flash unit is ready to fire such as is provided upon energization of a flash "ready" light.

According to an exemplary embodiment of the present invention, a camera is provided which has a built-in flash unit and the usual automatic or manual electronic system for energizing and firing the flash unit when a picture is to be taken. The circuit for the flash unit includes the usual high voltage charging system for the capacitor that fires the flash tube, as well as the usual "ready" light which illuminates when the capacitor is sufficiently charged. This ready light is typically a neon light and is generally disposed on the back of the camera or viewable in the viewfinder to indicate when the flash circuit is ready to fire to emit a flash of light. The present invention provides a red-eye reduction lamp on or near the front of the camera and facing forward toward a subject to be photographed, and which lamp comes on (is energized) as soon as the flash circuit is charged as indicated by the ready light coming on. The red-eye reduction lamp on the front of the camera is selected to provide sufficient illumination to reduce the size of the pupil of the subject to thereby reduce or eliminate the red-eye problem. When the flash is turned off, the red-eye reduction lamp likewise goes off.

The same concepts are applicable for providing a red-eye reduction lamp on the front of a detachable flash unit, rather than on the front of the camera, such that the lamp is aimed to provide illumination toward the eyes of the subject being photographed. This can allow more compact (e.g., shorter) detachable flash units to be provided and thus enable a less bulky camera/detachable flash unit combination.

Thus, both the flash ready and a red-eye reduction lamps come on together, and are turned off together when the flash is turned off (either by manually turning off the flash or by turning off the camera, or by the auto turn off circuit of some cameras or flash units). This provides the benefit that neither the user nor the camera or flash circuitry needs to "think" about or automatically turn on and off the red-eye reduction lamp just before the flash picture is taken. The user does not need to pause partway down during the shutter depression and wait for the preflash, and the camera circuitry does not require "pause" logic (e.g., a one second delay). Thus, the red-eye reduction light is illuminated and shines the entire time while the user is composing the picture.

BRIEF DESCRIPTION OF THE DRAWING

These and other objects and features of the present invention will become better understood through a consideration of the following description, taken in conjunction with the drawing in which.

DETAILED DESCRIPTION

Figure 1A:
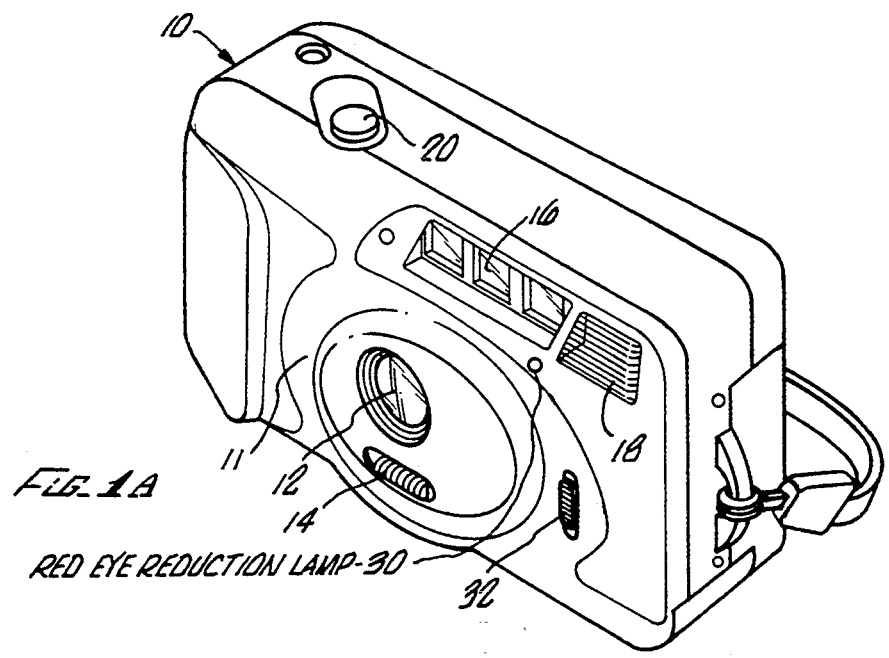
FIGS. 1a and 1b are, respectively, front and rear perspective views of a camera according to the present invention.
Figure 1B:
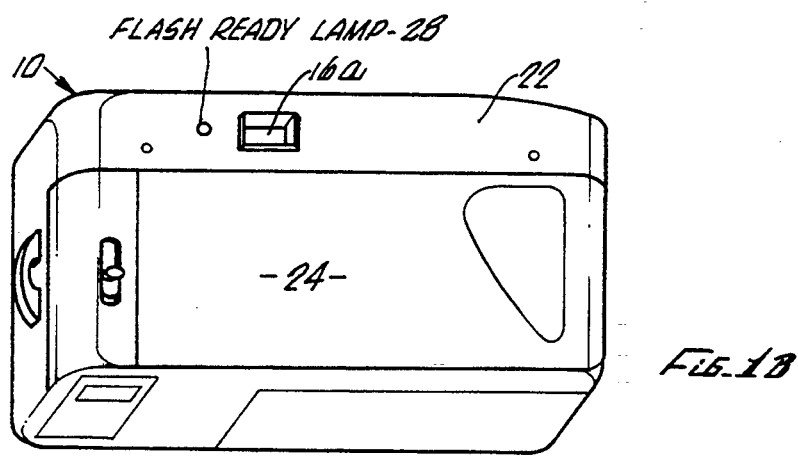

Turning now to the drawing, FIGS. 1a and 1b illustrate perspective views of a compact flash camera according to an exemplary embodiment of the present invention, and wherein FIG. 1a is a perspective view of the front, top and left side of the camera, and FIG. 1b is a perspective view of the back, bottom and left side thereof. The camera has the usual camera body 10 with a front 11 and a lens 12. Also provided are an on/off switch 14, viewfinder 16, electronic flash 18 and shutter release button 20. The back 22 of the camera body 10 as seen in FIG. 1b includes the usual hinged door 24 for allowing photographic film to be inserted into the camera, and includes the eye-piece 16a of the viewfinder 16. The back 22 of the camera body 10 also has a flash ready lamp 28 of the type which is typical in cameras of this nature. This flash ready lamp 28 can either be disposed in the back 22 of the body 10, or it can be arranged such that it is viewable within the viewfinder 16a, all as is well-known to those skilled in the art.

According to the present invention, the front 11 of the camera body 10 includes a red-eye reduction lamp 30 which faces forward (in the direction of the axis of the taking lens 12) so as to provide light toward the eyes of the subject being photographed to cause the pupils to reduce for reduction or elimination of the red-eye problem. The red-eye reduction lamp 30 may be a bulb or a light emitting diode (LED). If desired, a separate flash on/off switch 32 can be provided, or the switch 14 can provide the on/off functions for both the camera electronics and the flash 16.

The sequence of operation according to the concepts of the present invention after the camera itself has been turned on is that, (1) the flash is turned on (either by switch 32 or switch 14), (2) the flash circuit charges, (3) once the flash circuit has charged, the flash ready lamp 28 as well as the red-eye reduction lamp 30 both come on, (4), the red-eye reduction lamp 30 stays on causing the red-eye reduction action on the subject's pupil's (rather than being a flash or several flashes as has been done in the prior art), (5) the camera user then depresses the shutter button 20 to take the picture (to open the camera shutter and fire the flash 18 in a conventional manner), and (6) either additional photographs are taken or the user turns off the flash, or the flash turns itself off automatically, which causes both the ready lamp 28 and the red-eye reduction lamp 30 to turn off.

Thus, the mere act of turning on the camera and aiming the camera at the subject allows the red-eye reduction lamp 28 to shine at the subject as soon as the flash 18 is ready to fire. The red-eye reduction lamp 30 goes on as soon as the flash 18 is ready, and stays on while the camera is focused (automatic or manual) and while the photograph is being composed. This lamp goes off when the flash 18 goes off. Thus, there is no special care that the camera operator needs to take nor worry about a sensitive shutter release button.

Although the ready lamp 28 should be at or near the back of the camera so it is readily observable by the operator, the red-eye reduction lamp 30 can be located at almost any place on or near the front of the camera, such as the location as shown in FIG. 1a, or even aimed forwardly from the viewfinder window, from inside the lens cavity, or from inside the flash 18 in front of the flash lamp reflector therein. Furthermore, a single lamp could provide both the ready lamp 28 and the red-eye reduction lamp 30 function; however, the ready lamp 28 normally is energized by high voltage, whereas high voltage is not needed for the lamp 30 and the lamp 30 can be a low voltage lamp or LED or, alternatively, both could be high voltage lamps. The present concepts are useful for disposable cameras, and can be incorporated into a separate flash unit as earlier noted if desired.

Figure 2:
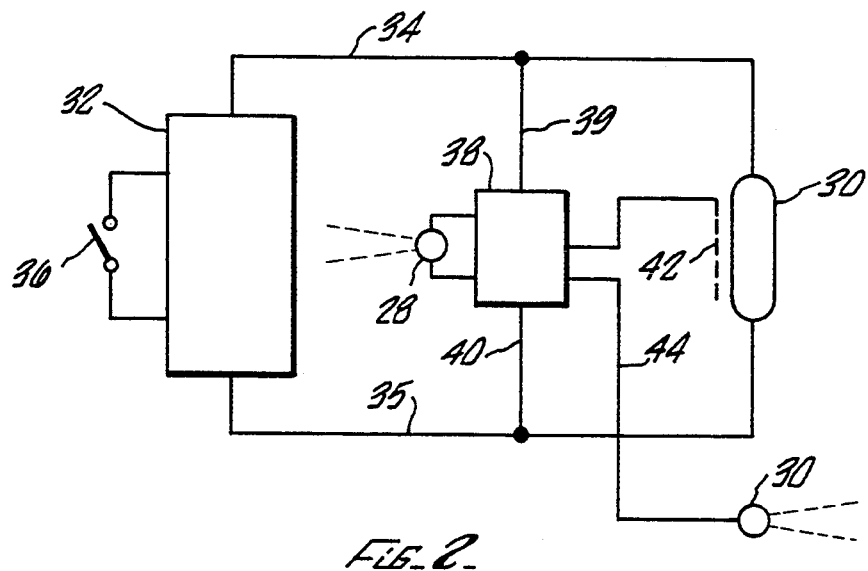
FIG. 2 is a block diagram of the flash and red-eye reduction lamp system of the present invention.

FIG. 2 is simplified electrical block diagram of an electronic flash and ready light system according to the concepts of the present invention. A flash tube 30 of the flash unit 18 is connected to a high voltage and control circuit 32 by electrical lines 34 and 35. A switch 36 represents a flash on/off switch as provided by either the switch 32 or the switch 14 of the camera shown in FIG. 1a. A trigger circuit 38 is connected by lines 39 and 40 with the voltage supply and control circuit 32, and this circuit 38 functions in a conventional manner to energize the ready light 28 (which typically is a neon bulb) when the main capacitor (not shown) is sufficiently charged to fire the flash tube 30, and to fire the flash tube 30 by providing a high voltage pulse to its firing electrode 42. In addition, the trigger circuit 38, according to the present invention, is connected via a line 44 to the red-eye reduction lamp 30 to energize the lamp 30 and therefore cause it to emit light when the ready lamp 28 does. This lamp 30 can be on the front of the camera as shown in FIG. 1a or on the front of a detachable flash unit as discussed earlier. Thus, the ready lamp 28 and the red-eye reduction lamp 30 are caused to be on or off together. Although separate lamps 28 and 30 are preferred, a single lamp could provide both functions provided the single lamp is sufficiently bright to cause a reduction in the size of the subject's pupils at a normal flash-to-subject distance of, for example, 4–12 feet. If a single lamp is used, it could, for example, be disposed to emit light from the front of the camera toward the subject, and with a light pipe being provided to supply "ready" lamp illumination to the back of the camera or toward the eye piece 16a.

A red-eye reduction system of the present invention is relatively simple, and minimizes the care with which the photographer must operate the camera in composing and taking a picture while still minimizing the red-eye problem.

While embodiments of the present invention have been shown and described, various modifications may be made without departing from the scope of the present invention, and all such modifications and equivalents are intended to be covered.

What is claimed is:

1. A compact photographic camera having an electronic flash unit and a circuit for energizing and firing a flash tube of the flash unit, the circuit having connected thereto a "ready" light which is energized when the flash tube is ready to be fired, the improvement comprising a red-eye reduction lamp disposed on or near the front of the camera and adapted to be energized by the circuit and maintained energized for the entire duration the ready light is energized.

2. A photographic camera as in claim 1 wherein the ready light is a neon lamp conventionally used in flash units and the red-eye reduction lamp comprises an LED.

3. A photographic camera as in claim 1 wherein the ready light is a neon lamp conventionally used in flash units and the red-eye reduction lamp comprises a bulb.

4. A camera as in claim 1 wherein the red-eye reduction lamp is mounted on the body of the camera to emit light in the direction of the axis of a lens of a camera and toward a subject to be photographed.

5. A camera as in claim 1 wherein the "ready" light is disposed on the back of the camera.

6. A compact photographic camera having an electronic flash unit and a circuit for energizing and firing a flash tube of the flash unit, the circuit having a light connected thereto which light is energized and maintained energized for the entire duration the flash tube is ready to be fired, and which light also provides red-eye reduction illumination from on or near the front of the camera.

7. A camera as in claim 6 wherein the light comprises a "ready" light on the back of the camera and a red-eye reduction light on the front of the camera.

8. An electronic flash unit for use in taking flash photographs and for reducing the red-eye effect, the flash unit having a circuit for energizing and firing a flash tube of the flash unit, the circuit having connected thereto a "ready" light which is energized when the flash tube is ready to be fired, the improvement comprising a red-eye reduction lamp disposed on or near the front of the flash unit and adapted to be energized by the circuit and maintained energized for the entire duration the flash tube is ready to be fired.

9. A method of taking a photographic picture of a subject and for reducing the red-eye effect comprising the steps of energizing a flash unit to cause a flash tube thereof to be ready to emit a flash of light for taking a picture, illuminating a "ready" lamp when said energization is sufficient for firing the flash tube, energizing a red-eye reduction lamp and causing it to emit light toward a subject to be photographed, and maintaining the red-eye reduction lamp illuminated for the entire duration there is sufficient energization to fire the flash tube.

* * * * *